(12) United States Patent
Ettridge

(10) Patent No.: US 6,724,121 B2
(45) Date of Patent: Apr. 20, 2004

(54) FLAT MECHANICAL ELECTRIC COMMUTATORS

(76) Inventor: John Patrick Ettridge, 53 Branksome Terrace, Dover Gardens, South Australia (AU)

( * ) Notice: Subject to any disclaimer, the term of this patent is extended or adjusted under 35 U.S.C. 154(b) by 0 days.

(21) Appl. No.: 10/181,364

(22) PCT Filed: Jan. 15, 2001

(86) PCT No.: PCT/AU01/00032
§ 371 (c)(1),
(2), (4) Date: Oct. 7, 2002

(87) PCT Pub. No.: WO01/54235
PCT Pub. Date: Jul. 26, 2001

(65) Prior Publication Data
US 2003/0090165 A1 May 15, 2003

(30) Foreign Application Priority Data

Jan. 17, 2000 (AU) .............................. PQ5110
May 4, 2000 (AU) .............................. PQ7279

(51) Int. Cl.$^7$ .............................................. H02K 13/04
(52) U.S. Cl. ................... 310/237; 310/233; 310/237; 310/204; 310/268; 310/220; 310/219; 310/225
(58) Field of Search .................. 310/233, 237, 310/204, 268, 220, 219, 225

(56) References Cited

U.S. PATENT DOCUMENTS

| | | | | |
|---|---|---|---|---|
| 3,602,749 A | * | 8/1971 | Esters ..................... | 310/154.21 |
| 4,949,023 A | | 8/1990 | Shlien ..................... | 310/229 |
| 5,105,111 A | * | 4/1992 | Luebke .................... | 310/254 |
| 5,600,191 A | * | 2/1997 | Yang ....................... | 310/237 |
| 6,396,175 B2 | * | 5/2002 | Fujita et al. .............. | 310/249 |

FOREIGN PATENT DOCUMENTS

FR  2495849  6/1982 ........... H01R/43/06

OTHER PUBLICATIONS

Derwent Abstract Accession No. 84-236391/38, Class V06, SU 1069073A, (LVOV POLY)Jan. 1984.
Derwent Abstract Accession No. 92-329278/40, Class V06, SU 1260106 A, (LVOV POLY) Nov. 1991.
Derwent Abstract Accession No. 2000-082947/07, Class V06, JP 11332198 A, (DB SEIKO KK) Nov. 1999.

* cited by examiner

Primary Examiner—Tran Nguyen
Assistant Examiner—Yahveh Comas
(74) Attorney, Agent, or Firm—Cook, Alex, McFarron, Manzo, Cummings & Mehler, Ltd.

(57) ABSTRACT

An improved flat or cylindrical mechanical electric commutator with neutral segments (4) between the current carrying segments which allow the current carrying carbon brushes (11, 12, 13, 14) in a brush holder (7) to pass from a negative current carrying segment to a positive current carrying segment or the opposite charge current in the base of the commutator without allowing the face or any part of the carbon brush to touch both the negative and positive segments in the base of the commutator at the same time, resulting in the switching of the electric current to an energized coil of an electric motor, electrical generator or electric apparatus or device, at predetermined intervals and times to suit the design requirements of the energized coil, electric motor of the stepper, brushless DC and switched design, electric generator or electric apparatus or device, while the commutator can accommodate single phase electrical circuits, double phase electrical circuits, three phase electrical circuits or any number of faces as required by the design specifications, all operating independently of each other.

5 Claims, 12 Drawing Sheets

Figure 1:
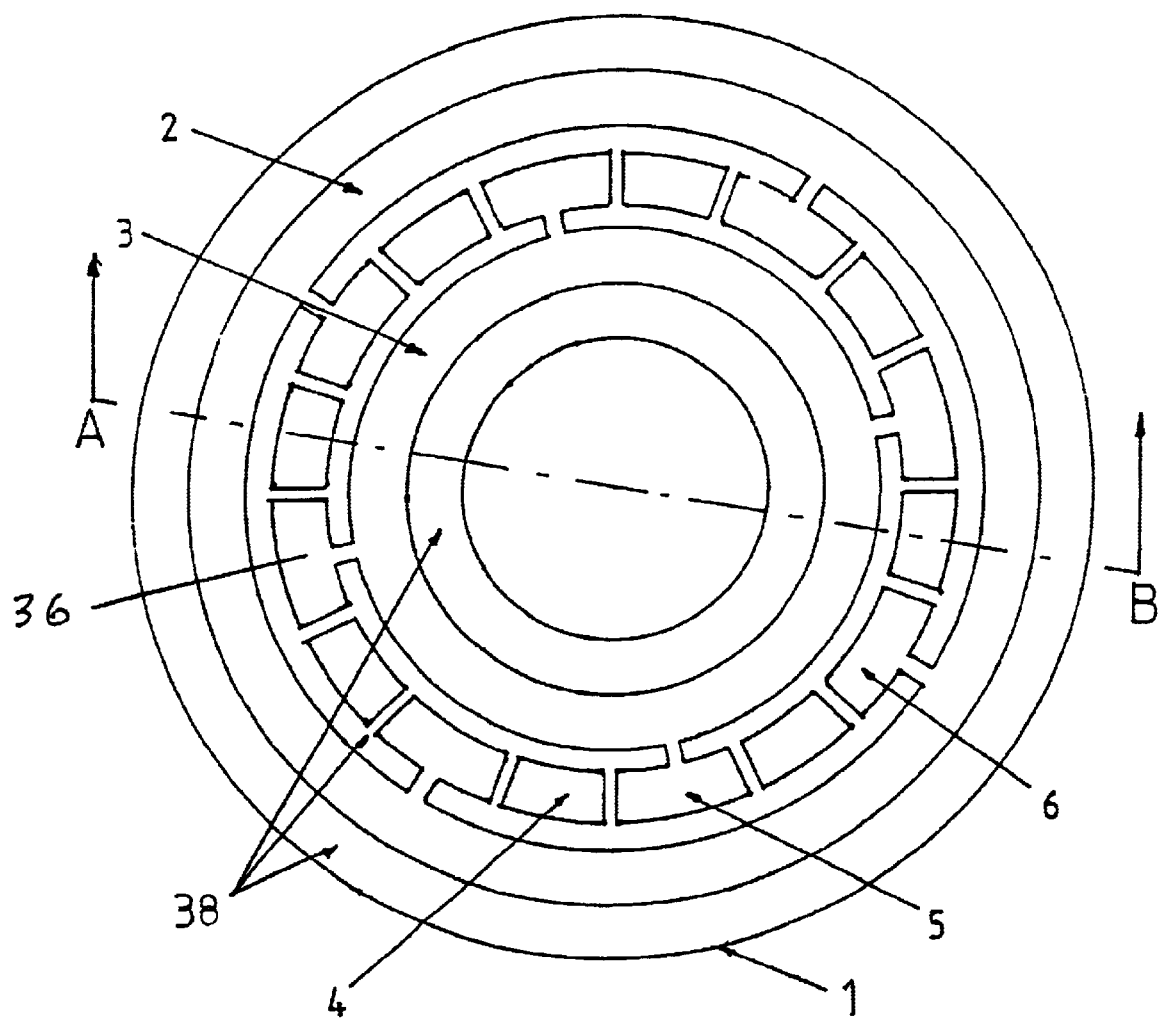

CROSS SECTION A, B,

FLAT MECHANICAL ELECTRIC COMMUTATORS

The following statement is a full description of this invention, including the best Method of performing it known to me:

The normal "carbon brush on a round segmented copper armature commutator" only changes the direction of the electrical current twice for every single rotation of the round segmented copper armature. The number of times the direction of the electrical current can be changed, can be increased by increasing the number of the carbon brushes in pairs. One to carry the positive current, and one to carry the negative current. One of the main problems with this type of commutator is that the carbon brushes can touch both the negative charged segment of the armature, and the positive charged segment of the armature at the same time, causing it to arc. This can cause premature wearing out of the carbon brushes, and damage to the energized coil of the armature is not allowed to rotate. The new non-classical electric motors, like the stepper motors, brushless DC motors and switched reluctance motors were made possible by advances in semiconductor technology, because of their reliance on position sensing, and numerous switching of the direction of the current for every single rotation of the rotor.

One of the objects of this invention is to provide a simple, effective and low cost carbon brush commutator, which can do the same operation, of switching the electrical current, as an electronic commutator, with the advantages that a person can physically see to control the timing of the switching of the electrical current, and if it is not working, what is wrong, with the added advantage that the carbon brushes can be individually replaced if worn out, unlike an electronic commutator, which requires specialized testing equipment to determine which component is faulty, with the usual replacing of the whole electronic controller, as it is not cost effective to repair.

In the Drawings:

FIG. 1. Shows a flat single phase commutator base, with three rings of copper material in bedded in a round piece of insulating material, which has a larger diameter than the outer copper ring. The inner copper ring is continuous. The outer copper ring is also continuous. The middle copper ring is broken up into segments, in groups of four, for each time the electrical current is to be switched, some are connected to the outer ring, some are connected to the inner ring, and some are neutral, surrounded by insulation material.

Figure 2:
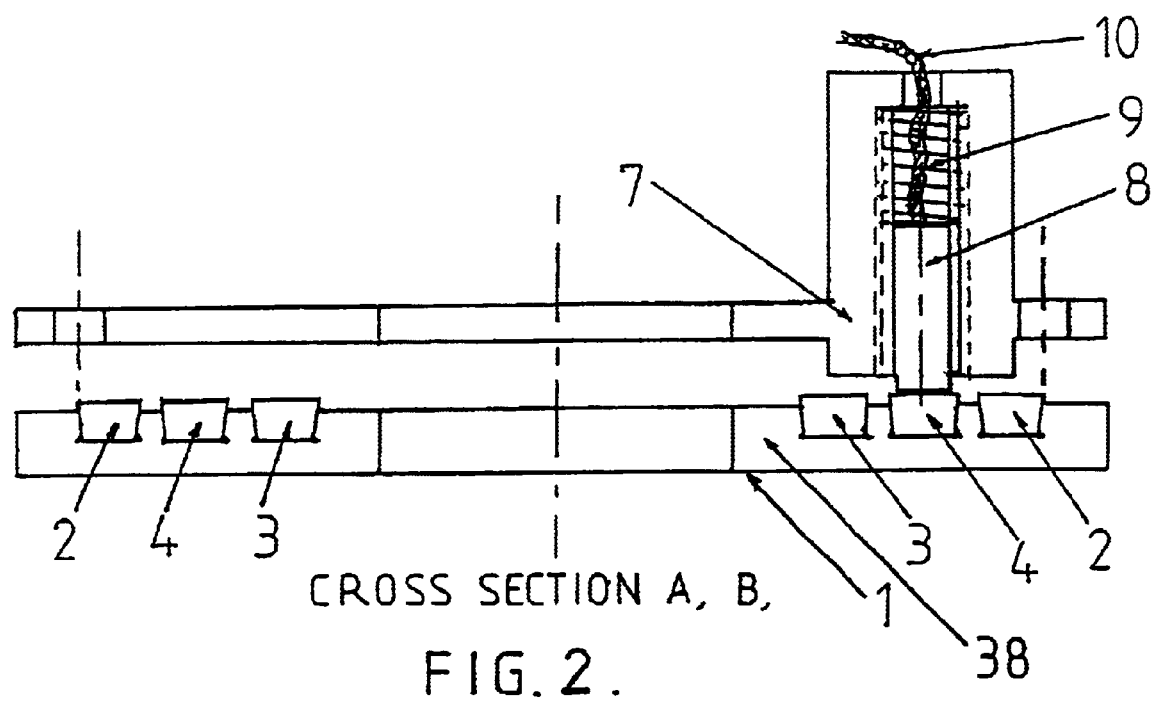

FIG. 2. Shows a cross section A, B, of FIG. 1, view of the flat commutator with the three copper rings positioned in the insulation material and a carbon brush and brush holder positioned at 90 degrees to the flat commutator.

Figure 3:
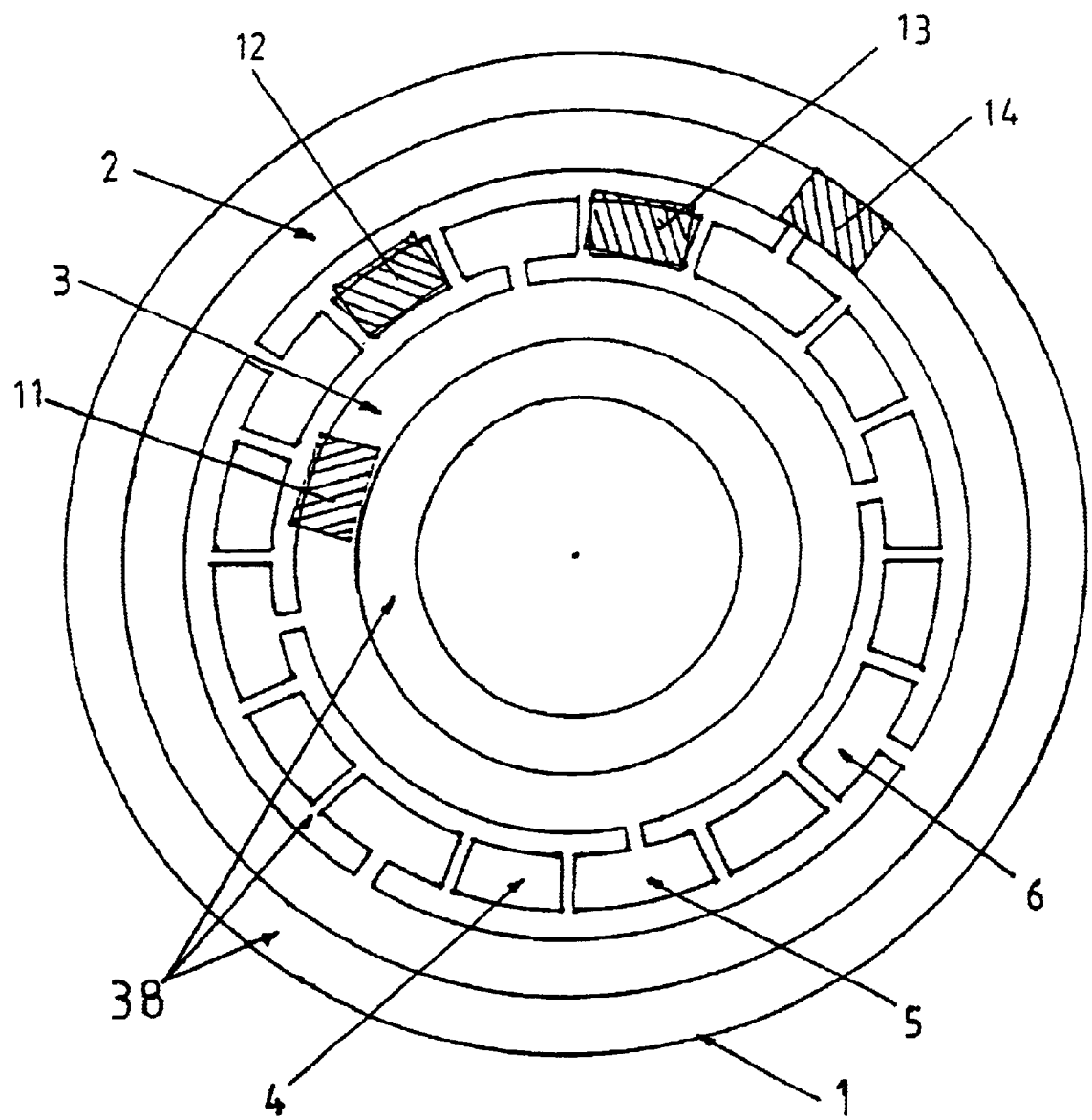

FIG. 3. Shows the base, and the first stage of a sequence for a single phase electric motor, and the position of one set of carbon brushes on a single phase commutator. With both carbon brushes positioned over "neutral" segments.

Figure 4:
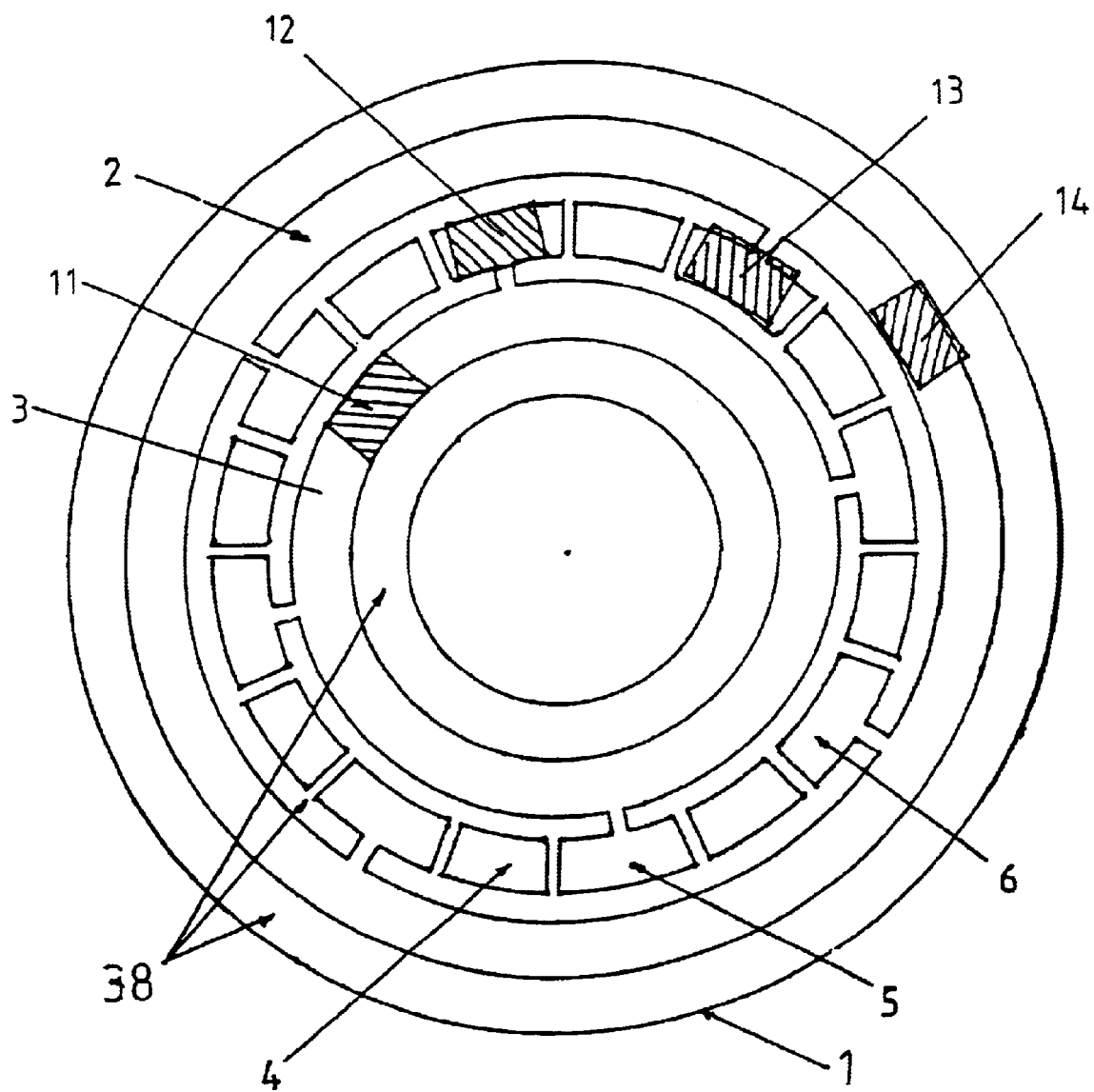

FIG. 4. Shows the base and the second stage, with the position of on set of carbon brushes on a single phase commutator. With one carbon brush positioned over the "positive" segment, while the other carbon brush is positioned over the "negative" segment.

Figure 5:
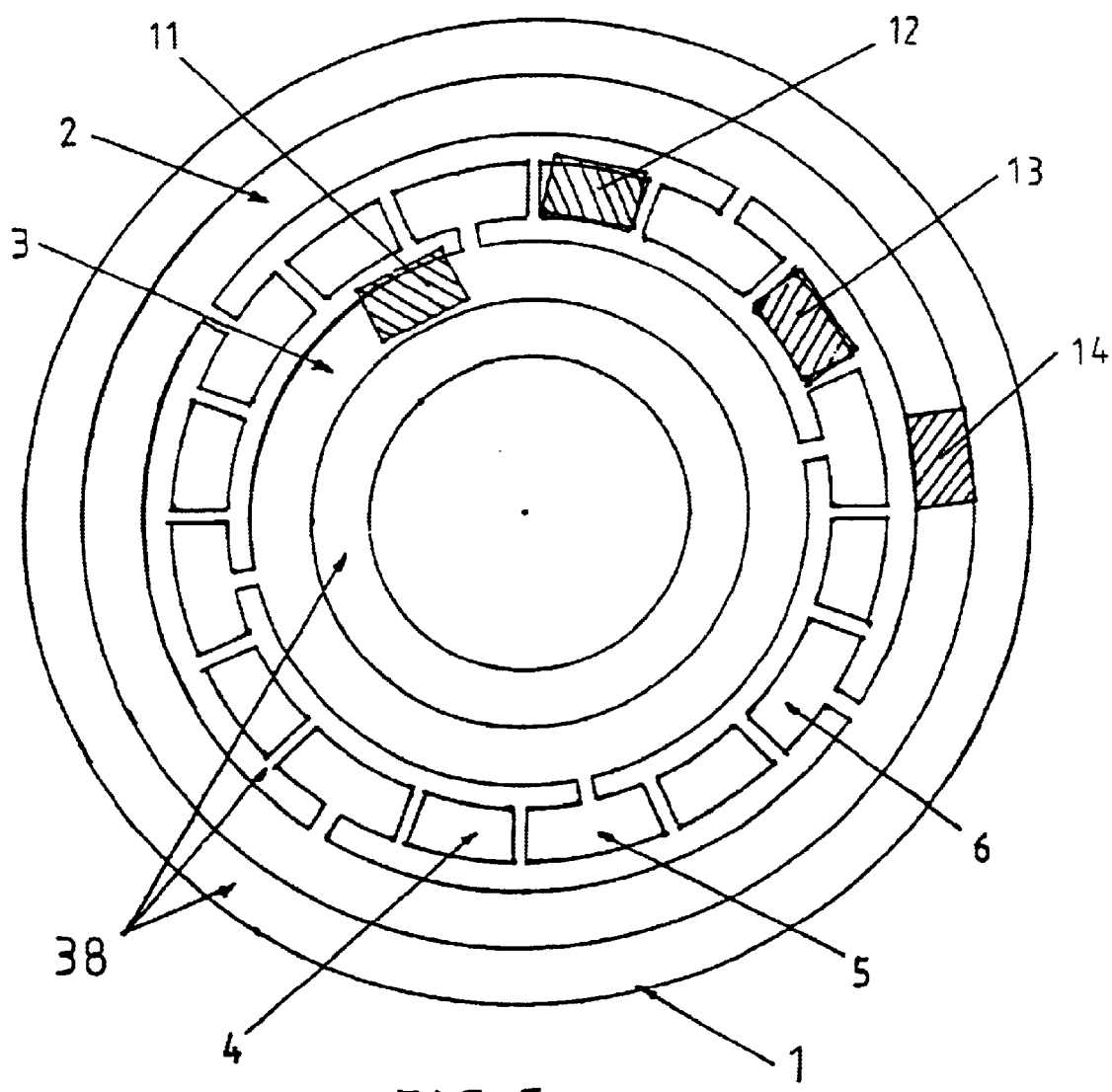

FIG. 5. Shows the base and the third stage, with the position of one set of carbon brushes on a single phase commutator. With both carbon brushes positioned over "neutral" segments.

Figure 6:
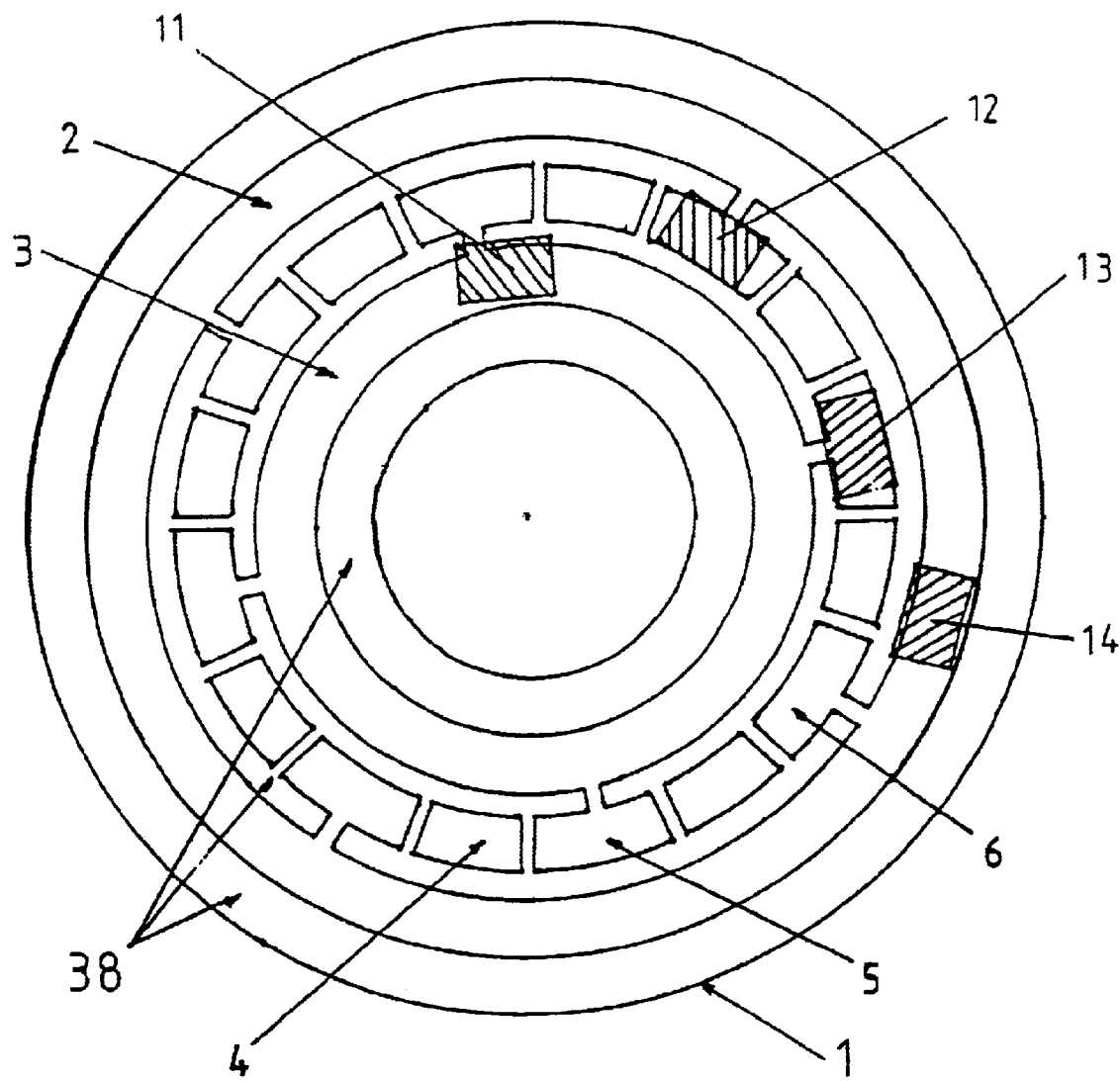

FIG. 6. Shows the base and the fourth stage, with the position of one set of carbon brushes on a single phase commutator. With the carbon brush which was positioned over the "positive" in stage two, now positioned over the "negative", and the other carbon brush which was positioned over the "negative" in stage two, now positioned over the "positive" segment. The sequence started in FIG. 3 continues.

Figure 7:
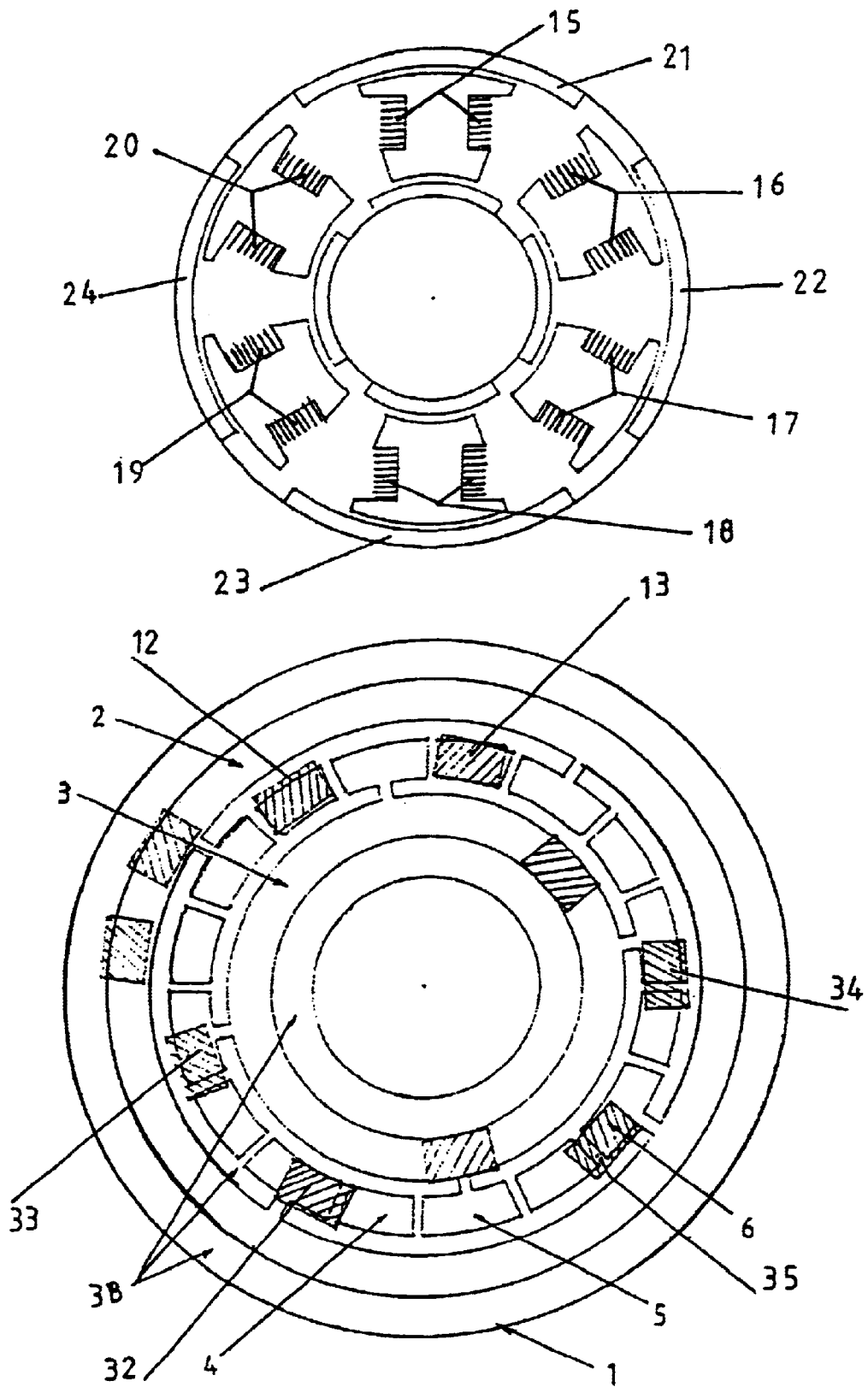

FIG. 7. Shows the base, and the positions of the carbon brushes on the first phase of a three phase commutator, and their connection to the energized coils on a six pole, three phase electric motor.

Figure 8:
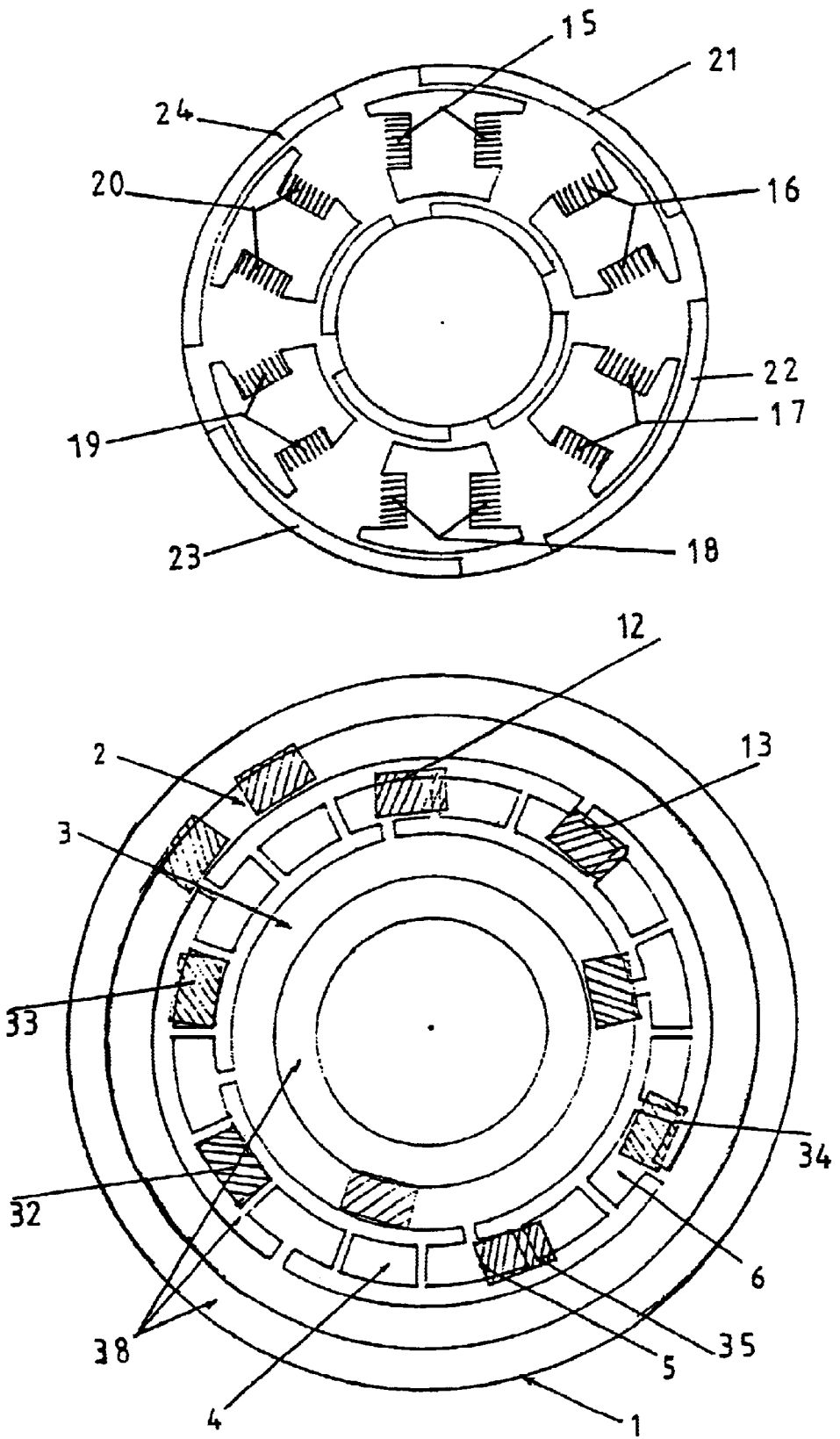

FIG. 8. Shows the base and the positions of the carbon brushes on the second phase of a three phase commutator, and their connection to the energized coils on a six pole, three phase electric motor.

Figure 9:
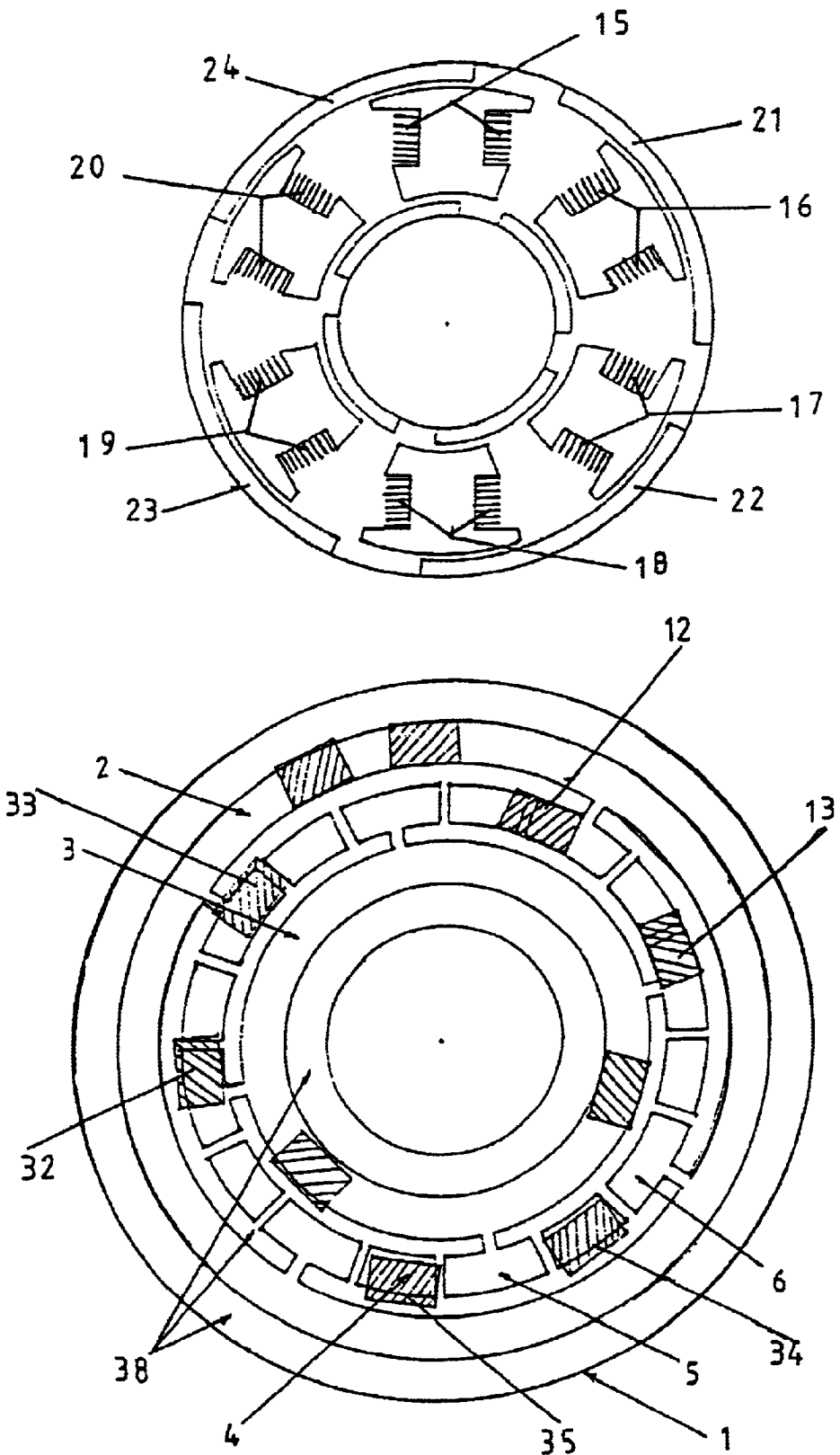

FIG. 9. Shows the base and the positions of the carbon brushes on the third phase of a three phase commutator, and their connection to the energized coils on a six pole, three phase electric motor.

Figure 10:
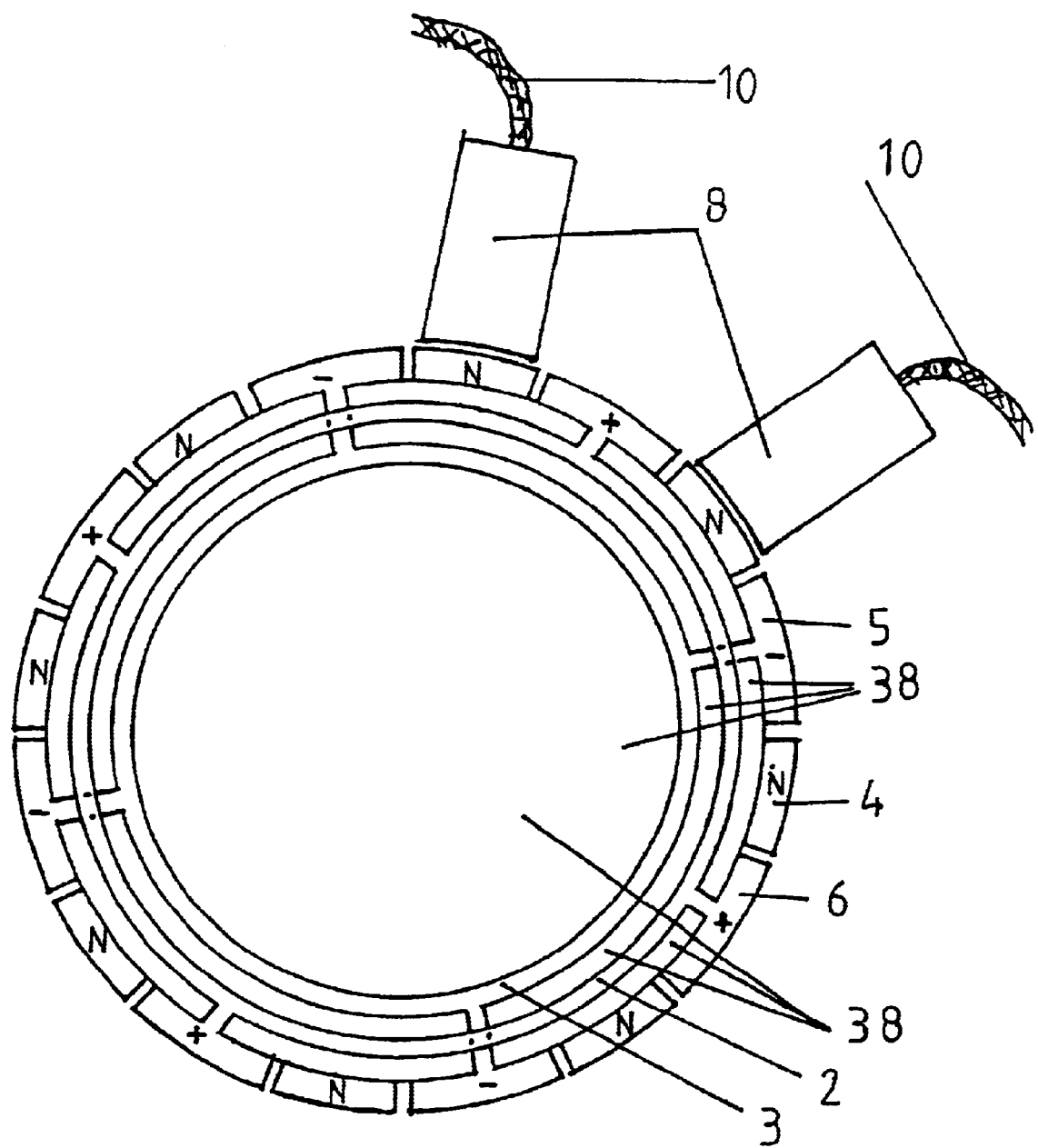

FIG. 10. Shows an alternative method to the flat base commutator, which is a cylindrical commutator with slip rings, and segments radiating outwards, with carbon brushes positioned on the circumference.

Figure 11:
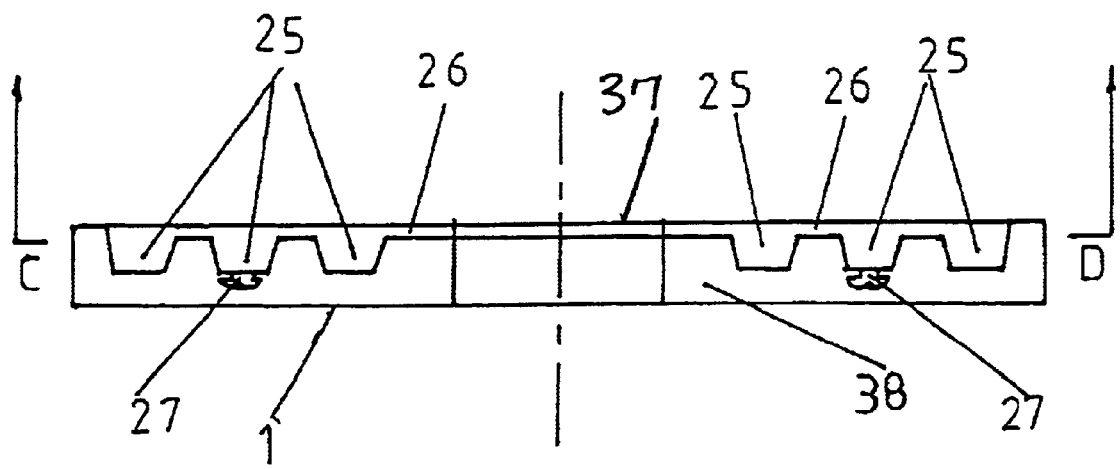

FIG. 11. Shows one of the methods to manufacture the base of the flat carbon brush commutator, without having to inlay the copper segments into the insulation material individually.

Figures 12, 13, 14:
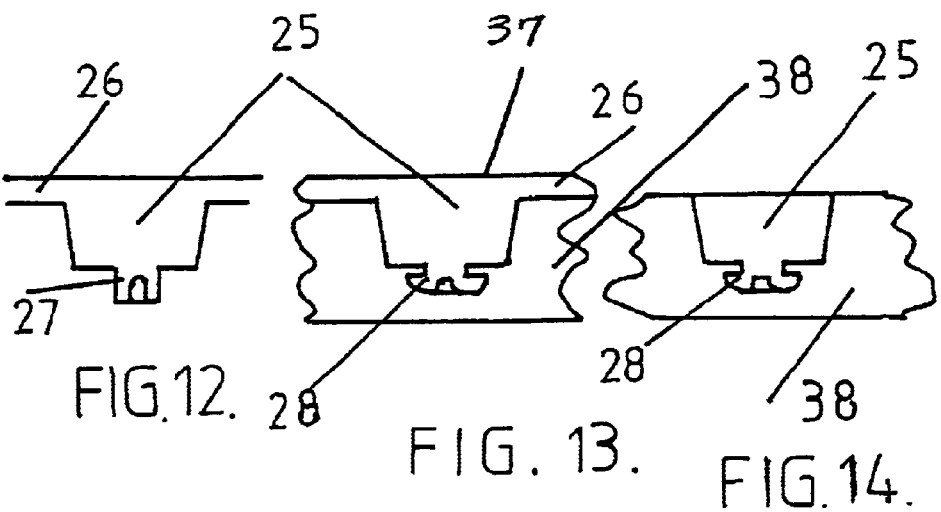

FIG. 12. Shows stage one, of one of the methods to secure and fix in position the outside copper ring, the center ring segments and the inner copper ring.

FIG. 13. Shows stage two, of one of the methods to secure and fix in position the outside copper ring, the center ring segments and the inner copper ring.

FIG. 14. Shows stage three, of one of the methods to secure and fix into position the outside copper ring, the center ring segments and the inner copper ring, with the copper backing sheet removed, leaving the rings and segments securely imbedded in the insulating material, preventing them from moving.

Figure 15:
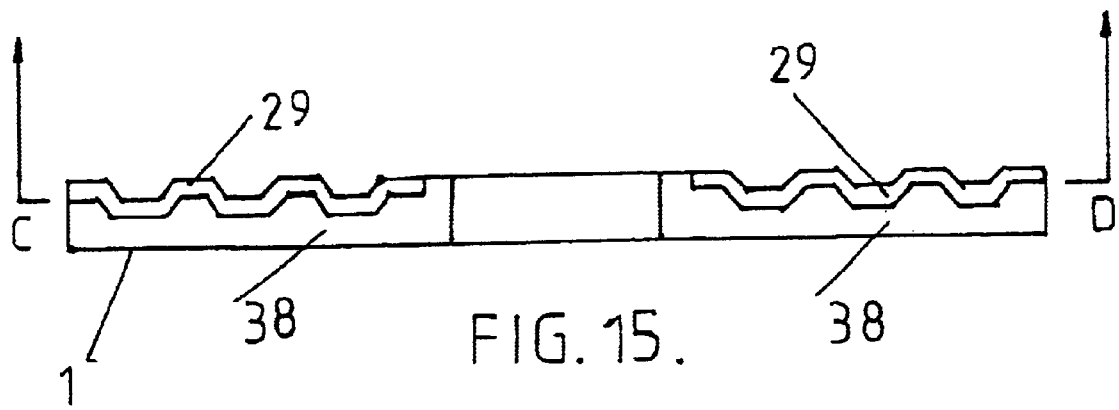

FIG. 15. Shows an alternative method to secure and fix in position the outside copper ring, the center ring segments and the inner copper ring, by pressing the base shape into a sheet of copper material, with the bottom of the highest part, higher than the top of the lowest part, so that when the top material, or backing sheet is removed, the rings and segments are positioned into the insulating material.

Figure 16:
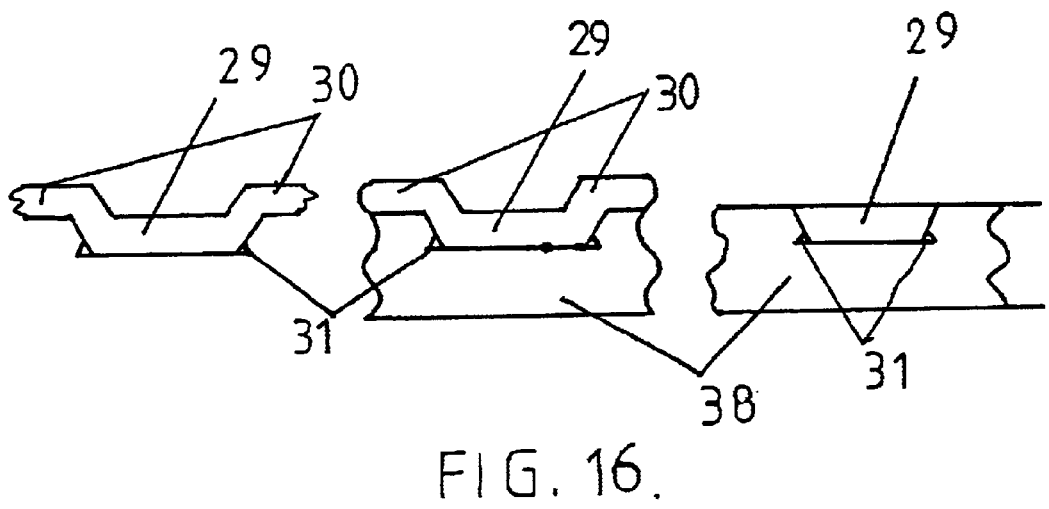

FIG. 16. Shows the three stages of an alternative method referred to in FIG. 15, with flared sections at the base of the pressing for locking the sheet into the insulating material, to prevent them from moving.

This invention in its simplest form consists of referring to FIG. 1, an outer ring 2, an center segmented ring 36, and an inner ring 3, of copper attached to a flat round piece of insulation material 38, which has a larger diameter than the outer copper ring 2. The inner copper ring 3 is continuous. The outer copper ring 2, is also continuous. The middle copper ring 36, is broken up into segments 4,5,6, in groups of four, for each time the electrical current is to be switched. The first segment of the group is independent or neutral 4, and is not connected to either the outer 2 or inner ring 3, and has insulation material 38, on four sides to prevent shorting with the other segments 5,6. The second segment 6, of the group is connected to the outer ring 2, but not to the inner ring 3, or a neutral segment 4, but has insulation material 38, on three sides to prevent shorting with the other segments 5. The third segment 4, of the group is also independent or neutral 4, and is not connected to either the outer 2, or inner rings 3. This segment has insulation material 38, on four sides to prevent shorting with the other segments 5, 6. The fourth segment 5, of the group is connected to the inner ring 3, but not to the outer ring 2, or neutral segments 4, but has insulation material 38, on three sides to prevent shorting with the other segments 6. It is not important whether they are called second and fourth segments, provided there is a neutral segment 4, between every segment that is joined to the inner 3 or outer 2 copper electric current carrying slip rings.

FIG. 2. A carbon brush holder 7, FIG. 3 with four carbon brushes 11,12,13,14, is fitted FIGS. 3.,4.,5.,6., so that one contacts the outer copper ring 2, one contacts the inner copper ring 3 and there are two carbon brushes 12, 13, on the center copper ring 36, one in front of the other. FIG. 4. They are positioned so that one is on the segment 13, connected to the outer ring 2, and one is on the segment 12, connected to the inner copper ring 3. The segments 4,5,6, are of equal length, and the size or surface area of the carbon brushes 8, in contact with the copper rings 2,3, and segments 36, is governed by the size of the neutral copper segments 4. The operation of the flat mechanical electric commutator is as follows. The base of the commutator rotates 1, and the carbon brushes 8, are fixed in a set position in the carbon brush holder 7, made of insulated material 38. To start with in FIG. 4 the front carbon brush 13 in the center ring segment is touching the copper ring segment 6, connected to the (+) positive electrical charge outer ring 2, so it also will be a (+) positive connection.

While the carbon brush 12, touching the copper ring segment 5, in the center ring connected to the (−) negative electrical charge inner ring 3, will be a (−) negative connection. As the commutator rotates FIG. 5., the front carbon brush 13, moves from the (+) positive segment 6, over the neutral segment 4, FIG. 6., to the (−) negative segment 5, and now becomes a (−) negative connection. The rear carbon brush 12, which was over the (−) negative segment 5, now has move over the neutral segment 4, then over the (+) positive segment 6, and now becomes a (+) positive connection. The neutral copper segments 4, allow the carbon brush 8, to move from the (−) negative electrical charged segment 5, to the positive (+) electrical charged segment 6, without shorting (touching both (−) negative and (+) positive segments 5, 6, at the same time).

The width of the carbon brushes 8, is such that it can not bridge the (−) negative segment 5, over the neutral segment 4, to the (+) positive segment 6. If the neutral segment 4, where not there, the gap between the negative segment 5, and the positive segment 6, would need to be to larger than the width of the carbon brush 8, for the carbon brush 8, to operate effectively. It would have to leave the negative segment 5, before it touched the positive segment 6, to prevent shorting, and could get trapped in the gap between negative 5, and positive segments 6. Causing the carbon brush 8, to break or suffer excessive wear FIG. 7. shows a single phase setup with the connections to an improved electric motor, illustrated at top of page, in which the carbon brush 12, is connected to the windings on the energized coil 15, which are connected to the windings on the energized coil 18, which are connected to the carbon brush 13, to complete the circuit. The windings are arranged, so both outer faces on the energized coils 15, 18, have the same magnetic pole.

In FIGS. 7., 8., by positioning a second set of brushes FIG. 8. 32, 33, on the center ring segments 36, on the base of the commutator 1, and connect carbon brush 32 to the windings of the energized coil 17 which is connected to the windings on energized coil 20, which is connected to the carbon brush 33 to complete the circuit. The windings are arranged, so both outer faces on the energized coils 17,20, are the same magnetic pole, and are the magnetic pole to suit the design of the motor. The placement of the carbon brushes 32,33, so that they actuate the switching at a different, but predetermined time make it is possible to use this flat copper carbon brush system for two phase motor commutation.

Like wise, FIG. 9. by positioning three sets of carbon brushes 12, 13:32,33: and 34,35, on the center ring segments, this system can be used for a three phase motor commutation. It can be used for any number of phase commutation, depending on requirements, simply be putting the number of carbon brush sets on the center ring segments 36, as described for a single phase, but by varying the switching times. In some applications it is not necessary to have the slip rings 2,3, if the base of the commutator 1, is the stationary component, and the carbon brush holder 7, is the moving part, and moves with the energized coils 15,16,17, 18,19,20, the electrical current can be supplied directly the appropriate copper segments 36. There may be other suitable materials to copper, so the reference to copper, covers all suitable materials, and is not limited to copper.

FIG. 10, shows a round commutator 1, with slip rings 2,3, which are connected to segments 5,6, there are neutral segments 4, which insulated 38, and are not connected to either positive or negative electrical current. Carbon brushes 8, are positioned around the circumference, to achieve the same desired switching as already described for a flat copper base, carbon brush commutator. It is important that the neutral segments 4, are positioned between the active segments 5,6, and that the width of the carbon brush 8, is less than the width of the neutral segment 4, to prevent arcing of the carbon brush 8. It is not important whether the lead 10, for the carbon brush 8 comes from the top or side of the carbon brush 8. In some applications it is not necessary to have the slip rings 2,3, if the base of the commutator 1, is the stationary component, and the carbon brush holder 7, is the moving part, and moves with the energized coils 15,16,17, 18,19,20. The electrical current can be supplied directly the appropriate copper segments 36. There may be other suitable materials to copper, so the reference to copper, covers all suitable materials, and is not limited to copper. This type of commutator is much simpler to make as once the number of switching operations is determined, a copper mold FIG. 11. 37, with a raised segments 25, standing proud (like little hills on a flat plain) connected by a thin backing plate layer of copper 26. The raised segments 25, could have a tubular protrusion 27, (similar to a semi tubular rivet) on top of the segment 25, which would be pressed to spread out over the top of the segment standing proud, 28 (similar to a semi tubular rivet with its end sprayed over). This copper molding 37, has insulation material 38, around all the segments standing proud 25, and incorporating some fastening or locating shape 27. The backing plate 26, is removed leaving the raised segments 25, locked in place.

The attached sprayed tubular protrusions 27, 28, ensure the copper segments 25, can not move in the insulating material base 38. The carbon brush holder 7, is molded of a suitable material like Bakelite, with the number and position of the carbon brushes 8, predetermined to suit the electric motor switching design requirements. This method of manufacture is much simpler and cost effective than the conventional carbon brush on round commutator, or electronic commutator currently in use. Those skilled in the art would know that not all the embodiment of this description may be needed to make the improved flat mechanical electric commutator. The materials may be changed to suit new materials developed. The number of groups of four segments 36, will vary to suit the number of switching operations required. It is not necessary to have all the carbon brushes 8, in the one holder 7, but it is desirable, as it guarantees the distance between the two center copper ring carbon brushes. It should be noted that the carbon brush connections 9, from the leads to the energized coils can be switched to suit design requirements as described in the second phase, due to the inside face of the permanent magnets 21,22,23,24, in the stator, being the opposite magnetic pole.

I claim:

1. An Improved Flat or Cylindrical mechanical Electric Commutator with neutral segments between the current carrying segments which allow the current carrying carbon brushes in a brush holder to pass from a negative current carrying segment to a positive current carrying segment or the opposite charge current in the base of the commutator without allowing the face or any part of the carbon brush to touch both the negative and positive segments in the base of the commutator at the same time, resulting in the switching of the electric currents to an energized coil of an electric motor, electrical generator or electric apparatus or device, at predetermined intervals and times to suit the design requirements of the energized coil, electric motors of the stepper, brushless DC and switched reluctance designs, electric generator or electric apparatus or device, while the commutator can accommodate single phase electric circuits, double phase electrical circuits, three phase electrical circuits or any number of phases as require by the design specifications, all operating independently of each other.

2. The Improved Flat or Cylindrical Mechanical Electric Commutator of claim 1, wherein flat continuous inner or outer slip rings are connected to some of the segment in a central segmented ring, to effectively switch the electrical charge being received by the central carbon brushes passing over the center ring segments.

3. The Improved Flat or Cylindrical Mechanical Electric Commutator of claim 1, whereas the carbon brush holder and brushes rotate around a stationary single segmented copper ring in the base or armature of the commutator.

4. A method for producing the segmented base or armature of an Improved Flat or Cylindrical Mechanical Electric Commutator of claim 1, by pressing a flat sheet of copper material or molding the raised required parts in copper or other suitable material, molding insulating material on three sides of the pressing or molding, leaving the raised parts clean and then removing the raised section to leave the required copper segments firmly fixed in the molded insulated material, held in by spread portions on the base of the segments, which make the base wider than the middle section of the segments.

5. A method for producing the segmented base or armature of an Improved Flat or Cylindrical Mechanical Electric Commutator of claim 1, by pressing a flat sheet of copper material or molding the raised required parts in copper or other suitable material, molding insulating material on three sides of the pressing or molding, leaving the raised parts to act as a backing sheet, which when removed, leave the required copper segments firmly fixed in the molded insulated material, held in by spread portions of semi tubular rivets on the base of the segments, which make the base of the rivets wider than the semi or tubular section of the rivet.

* * * * *